UNITED STATES PATENT OFFICE 2,216,274

HYDROCARBON REACTIONS

Aristid V. Grosse, Chicago, Ill., assignor to Universal Oil Products Company, Chicago, Ill., a corporation of Delaware No Drawing. Application October 21, 1939, Serial No. 300,581

3 Claims. (Cl. 196—10)

This application is a continuation-in-part of my co-pending application Serial No. 211,017 filed May 31, 1938.

This invention relates more particularly to a process involving the interaction of paraffin hydrocarbons of varying molecular weight and structure to form reaction products of an intermediate character while using catalysts which have been found experimentally to accelerate the desired reactions.

The invention is more particularly concerned with a novel method for converting relatively high boiling paraffin hydrocarbons into lower boiling hydrocarbons of selected boiling range by reactions involving a method of thermal decomposition and a minimum of the production of waste byproducts such as gases and heavy liquids boiling outside the range of motor fuel.

It is generally assumed that the paraffin hydrocarbons are unreactive among themselves and that when reactions occur at elevated temperatures, they follow primary decomposition reactions which produce active unsaturated radicals after the release of hydrogen and the rupture of carbon-to-carbon bonds. When these reactions are brought about by strictly thermal methods they correspond exactly to ordinary reactions of cracking as observed when petroleum fractions are thermally treated for the production of gasoline and there is a corresponding production of fixed gases and high molecular weight materials, though the exact amounts of these byproducts will vary with the type of paraffin or paraffin mixture treated and the conditions of operation.

At the present time attention is being directed to the production of high antiknock motor fuels of an iso-paraffinic character. These are produced by polymerizing low molecular weight olefins to form simple and mixed dimers and trimers thereof and then hydrogenating the liquid mono-olefins to produce paraffins. The nature of the polymerization reactions is apparently such that the polymers are of an isomeric or branched chain structure and their hydrogenated products have consequently a high antiknock value. The compound known as iso-octane, or 2,2,4-trimethyl pentane which is used as a standard of reference in giving knock rating of individual hydrocarbons or gasolines may be produced by catalytically polymerizing iso-butene to form 2,2,4-trimethyl pentane and hydrogenating the latter. In the steps of polymerization and hydrogenation in these cases there are frequently undesirably large amounts of paraffinic hydrocarbons boiling above the range desired in the finished products and the present invention is in one aspect concerned with the reconversion of these high boiling paraffins into paraffin hydrocarbons boiling within the desired range.

In one specific embodiment, the present invention comprises the interaction of relatively high molecular weight paraffin hydrocarbons with lower molecular weight iso-paraffin hydrocarbons in the presence of boron fluoride-hydrogen fluoride catalysts.

A typical reaction which falls within the scope of the present invention is that which occurs between normal dodecane and iso-butane. Although the mechanism is not exactly known, the following equations are suggested:

(1) 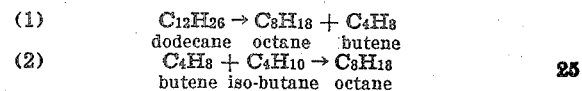
$$C_{12}H_{26} \rightarrow C_8H_{18} + C_4H_8$$
dodecane    octane    butene (2) $$C_4H_8 + C_4H_{10} \rightarrow C_8H_{18}$$
butene iso-butane octane It will be seen from the above equations the presumption is that under the influence of the preferred catalyst, the high molecular weight paraffin undergoes a splitting reaction to form a molecule of paraffin and a molecule of olefin and the molecule of olefin then reacts with iso-butane to form an octane by a type of alkylation reaction. It is further to be observed that there is complete conversion of the high boiling paraffin into the lower boiling paraffin although this theoretical yield is not always possible of attainment in practice.

Similarly other reactions may be brought about between high boiling paraffins and lower boiling iso-paraffins. For example, reactions may be brought about between cetane and iso-butane, cetane and iso-hexane, cetane and iso-octane although one of the principal applications of the present process is in the reconversion of paraffins boiling above octanes, which are produced in processes aimed at the production of iso-octane, back to the desired product. The iso-paraffins may be obtained from any source although the most readily utilizable source of iso-butane is the butane fraction produced from cracked gas mixtures after olefins have been removed by polymerization or alkylation reactions and residual paraffins fractionated. Iso-butane and other low boiling iso-paraffins essential for the reaction may be obtained by isomerization of the corresponding normal paraffins by recognized methods.

Reactions of the present character may be brought about either by batch or continuous methods. In batch operation the high-boiling paraffins and the lower-boiling iso-paraffins may be charged to a pressure vessel along with regulated amounts of boron fluoride and hydrogen fluoride while maintaining a suitable temperature for a time corresponding to best yields of the desired product. The interior of the vessel should preferably be of a material such as nickel which is resistant to the corrosive action of boron and hydrogen fluorides. When working with different combinations of hydrocarbons to form products of intermediate molecular weight, temperatures varying over a considerable range may be employed if these are properly inter-related with the time of exposure to reaction conditions. This range of temperatures is rather wide and is comprised within the approximate limits of $-30$ to $+150°$ C. Good results have been obtained at temperatures of the order of $0°$ C. with long times of reaction in contact with the catalyst, characteristic results being shown in following examples.

Continuous operations may be brought about by passing proportioned mixtures of hydrocarbons and catalysts through tubular elements of sufficient length to provide the requisite time factor and of design calculated to induce turbulence.

After the reactions have been completed the catalytic compound may be separated and recovered by fractionation and the hydrocarbon products further fractionated to obtain the desired intermediate hydrocarbon product and recover heavier and lighter materials which may be recycled and further reacted.

The following example is introduced to indicate the type of results normally obtainable in the application of the process although not with the purpose of unduly limiting the invention's proper scope.

A dodecane fraction was reacted with iso-butane in a stainless steel autoclave equipped with a mechanical stirrer. The following tabulation shows the principal data obtained in connection with the run:

| | |
|---|---|
| Average pressure, lb. per sq. in. | 38 |
| Contact time, hours | 43 |
| Temperature, °C. | 0 |
| $C_{12}H_{26}$ charged, parts by weight* | 69.5 |
| i-$C_4H_{10}$ charged, parts by weight | 48.0 |
| Boron fluoride charged, parts by weight | 14.8 |
| Hydrogen fluoride charged, parts by weight | 3.7 |
| Recovered: | |
| Upper layer | 112 |
| Lower layer | 11 |

* This was a cut from hydrogenated B-B polymer boiling at 185–192° C. $n_D^{20}=1.4302$ and it was completely saturated.

*Composition of upper layer*

| | |
|---|---|
| i-$C_4H_{10}$ | 24.8 |
| n-$C_4H_{10}$ | 5.4 |
| $C_5$ | 8.7 |
| $C_6$ | 4.5 |
| $C_7$ | 4.1 |
| $C_8$ | 15.3 |
| $C_9$ | 6.1 |
| $C_{10}$ | 5.0 |
| $C_{11}+C_{12}$ | 35.6 |

It will be seen from the above data that about one-half of the original iso-butane charged was consumed in the reaction and that the reaction produced liquid hydrocarbons from $C_5$ to $C_{10}$ in an amount equal to about 47% of the total dodecanes and iso-butane reacted. These fractions all boiled within the range of motor fuel and had a sufficiently high antiknock value to be directly blended with airplane fuel.

The following table gives a general summary of the reaction on a molal basis.

| | Moles charged | Moles reacted | Moles formed |
|---|---|---|---|
| Isobutane, $C_4H_{10}$ | .83 | .40 | |
| Dodecane, $C_{12}H_{26}$ | .41 | .30 | |
| Iso-octane, $C_8H_{18}$ | | | .13 |

I claim as my invention:

1. A process for interacting relatively high molecular weight paraffin hydrocarbons with lower molecular weight iso-paraffin hydrocarbons to form paraffin hydrocarbons of intermediate molecular weight which comprises contacting said hydrocarbons with catalytic material comprising essentially boron fluoride and hydrogen fluoride, at temperatures within the approximate range of $-30$ to $+150°$ C. and for times adequate to produce optimum yields of desired products.

2. A process for interacting relatively high molecular weight normal paraffin hydrocarbons with lower molecular weight iso-paraffin hydrocarbons to form paraffin hydrocarbons of intermediate molecular weight which comprises contacting said hydrocarbons with catalytic material comprising essentially boron fluoride and hydrogen fluoride, at temperatures within the approximate range of $-30$ to $+150°$ C. and for times adequate to produce optimum yields of desired products.

3. A process for interacting paraffin hydrocarbons of higher molecular weight than octane with iso-butane to produce substantial yields of octanes therefrom which comprises contacting said paraffin hydrocarbons at a temperature within the approximate range of $-30$ to $+150°$ C. and for a time adequate to produce substantial yields of said octanes with catalytic material comprising essentially boron fluoride and hydrogen fluoride.

ARISTID V. GROSSE.